United States Patent
Heron

(10) Patent No.: US 6,694,749 B2
(45) Date of Patent: Feb. 24, 2004

(54) ROTARY VALVE

(75) Inventor: Roger Artindale Heron, Stagsden (GB)

(73) Assignee: Oxford Magnet Technology Ltd., Witney Oxon (GB)

(*) Notice: Subject to any disclaimer, the term of this patent is extended or adjusted under 35 U.S.C. 154(b) by 0 days.

(21) Appl. No.: 10/274,378

(22) Filed: Oct. 21, 2002

(65) Prior Publication Data

US 2003/0089116 A1 May 15, 2003

(30) Foreign Application Priority Data

Oct. 19, 2001 (GB) ................................. 0125084

(51) Int. Cl.⁷ ..................... F25B 9/00; F01B 29/10; F16K 39/00; F16K 5/00
(52) U.S. Cl. ................. 62/6; 60/520; 251/283; 251/314; 251/304
(58) Field of Search ............... 251/283, 304, 251/313, 314; 62/6; 60/520

(56) References Cited

U.S. PATENT DOCUMENTS

| | | | |
|---|---|---|---|
| 3,620,029 A | | 11/1971 | Longsworth ................. 62/6 |
| 3,625,015 A | * | 12/1971 | Chellis ........................ 62/6 |
| 4,180,984 A | | 1/1980 | Chellis ........................ 62/6 |
| 4,538,416 A | * | 9/1985 | Riedy .......................... 62/6 |
| 4,858,441 A | * | 8/1989 | Wheatley et al. ............ 62/6 |
| 5,335,505 A | * | 8/1994 | Ohtani et al. ................ 62/6 |
| 5,361,588 A | | 11/1994 | Asami et al. ................ 62/6 |
| 5,442,923 A | * | 8/1995 | Bareiss ........................ 62/6 |
| 5,513,498 A | * | 5/1996 | Ackermann et al. ........ 62/6 |
| 5,701,743 A | * | 12/1997 | Hagiwara et al. ........... 62/6 |
| 6,167,707 B1 | * | 1/2001 | Price et al. .................. 62/6 |

FOREIGN PATENT DOCUMENTS

| | | |
|---|---|---|
| EP | 0350290 B1 | 12/1992 |
| GB | 1273762 | 6/1969 |
| JP | 9-236347 A | 9/1997 |

* cited by examiner

Primary Examiner—William C. Doerrler
(74) Attorney, Agent, or Firm—Crowell & Moring LLP

(57) ABSTRACT

A multiple port rotary valve for flow switching comprises a rotor (2), a stator (7), a compressor supply (8) and a compressor return (6). Gas is supplied via the compressor supply throughout a switching cycle such that the rotor is lifted away from the stator (7). The valve further comprises a balance ram to counteract the effect of the differential pressure produced by the compressor supply, such that a gas seal is formed at the rotor/stator interface.

16 Claims, 3 Drawing Sheets

STATOR FACE        ROTOR FACE

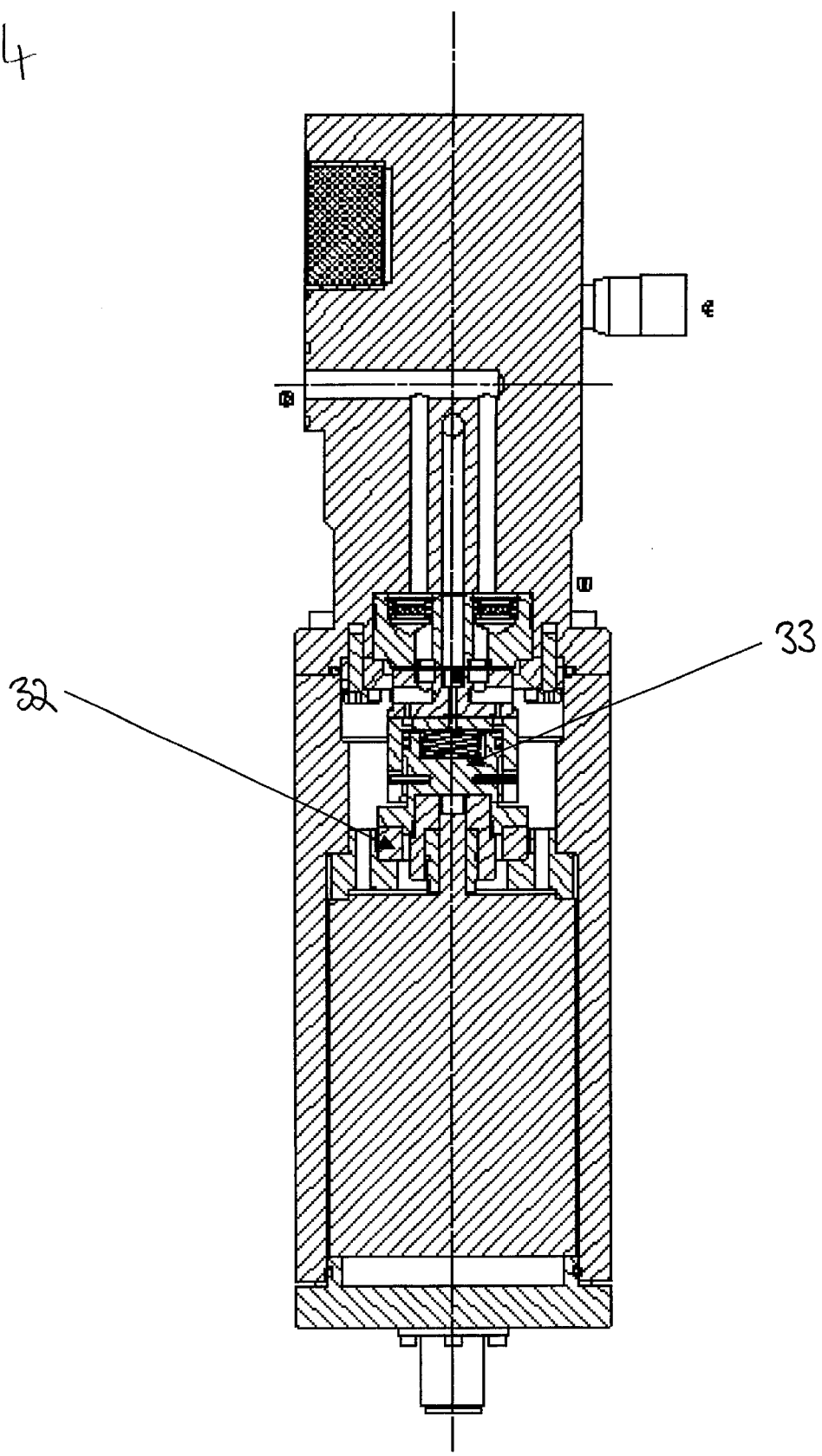

ROTARY VALVE

This invention relates to a rotary valve in particular for use in pulse tube refrigerators.

A typical use for a pulse tube refrigerator (PTR) is to maintain a cold environment in a thermal envelope surrounding a liquid helium cooled super-conducting magnet. Gaseous helium is generally used as the working fluid in the PTR. The operation of pulse tube refrigeration is well known.

In one form of pulse tube refrigeration, it is necessary for the helium gas supplied from a compressor to be fed in sequence—with a precisely controlled and repetitive cycle—to a number of interconnected chambers which comprise the PTR. The cycle rate, mark space ratio and phasing of these flow pulses are critical in achieving the required thermal performance. Discrete restrictors are also employed to separately control the inflow and the outflow of at least one—and typically two—of the flow paths from the PTR chambers.

The flow switching described above can be achieved in a variety of ways, including banks of solenoid operated valves operated under electronic control. An alternative means is by a multi-port rotary valve device, driven at constant speed, such as by a synchronous or stepper electric motor drive. A well-known form of such a valve is the port plate rotary valve. A rotor, which turns against a port plate, incorporates flow control ports on its running face, which interact with matching port profiles on the port plate to provide the valving action. The flow logic and timing is therefore dictated by the geometry and the valving action of the flow commutation elements of the rotary valve. The rotor and the port plate ports are variously interconnected with the PTR chambers and the compressor supply and return. The valve rotor and drive motor may conveniently be contained within a single pressure vessel incorporated within the PTR flow circuit.

In one form of such a valve, a closure force between the rotor and the port plate is obtained by virtue of the differential pressure acting between the compressor supply and the compressor return. This pressure is arranged to act to directly load the valve rotor against the port plate by directing the gas supply pressure to the chamber enclosing the rotor. Additional provision is made to hold the rotor against the stator using a spring to ensure an initial seal is developed under start up conditions. This initial seal allows the differential pressure to be developed across the rotor as the compressor pressure builds, forcing the rotor against the running face of the port plate. The magnitude of the closure force is a function of the differential pressure, the rotor face geometry and the opposing pressures developed in the port plate ports.

This approach is effective for simple two port rotary valves. However, for multiple port arrangements, it limits the complexity of the rotor and port plate porting or alternatively results in an excessively heavy closure force, which is typically significantly greater than that required to achieve an effective seal at the rotor interface. This results in unnecessary rotor and port plate wear and excessive drive torque requirements.

In accordance with a first aspect of the present invention, a multiple port rotary valve for flow switching comprises a rotor, a stator, a compressor supply and a compressor return; wherein gas is supplied via the compressor supply throughout a switching cycle such that the rotor is lifted away from the stator; the valve further comprising a balance ram to counteract the effect of the differential pressure produced by the compressor supply, such that a gas seal is formed at a rotor/stator interface.

In the rotary valve of the present invention, the supply pressure approaches the rotor from the stator contrary to conventional rotary valves. The differential pressure across the rotor tends to lift the rotor off the stator face and this tendency is counteracted by the balance ram which is accessed by the same supply pressure. By enabling a sufficient, but not excessive closure force, wear of the rotor and stator is reduced.

Preferably, the balance ram is powered by the compressor supply.

Preferably, the valve further comprises bias means, such that a seal is provided at the rotor/stator interface at start up.

In use, axial force generated by the balance ram is carried by a thrust bearing arrangement. This may be a rolling element thrust bearing arrangement, but preferably the valve further comprises an axial hydrostatic bearing.

A helium gas environment as encountered in a PTR is known to leach lubricant from conventional bearings which may cause premature bearing failure and the leached lubricant may contaminate the PTR. The same supply pressure used to generate the balance force can be utilised in an axial hydrostatic bearing, with the prospect of virtually zero friction and a virtually indefinite life without the need for lubricant.

Preferably, the bearing comprises a floating disc having a relieved centre, such that gas trapped under the disc acts substantially equally over the area under the rotor to react an applied thrust force.

Preferably, the disc has an area greater than the cross sectional area of a piston of the balance ram.

Preferably, the rotor is coupled to a motor shaft with two degrees of angular freedom.

Preferably, the thrust bearing is mounted directly behind the balance ram.

In accordance with a second aspect of the present invention a pulse tube refrigerator (PTR) comprises a multiple port rotary valve according to the first aspect and a plurality of chambers to receive gas from the compressor supply.

An example of a rotary valve according to the present invention will now be described with reference to the accompanying drawing in which.

Figure 1:
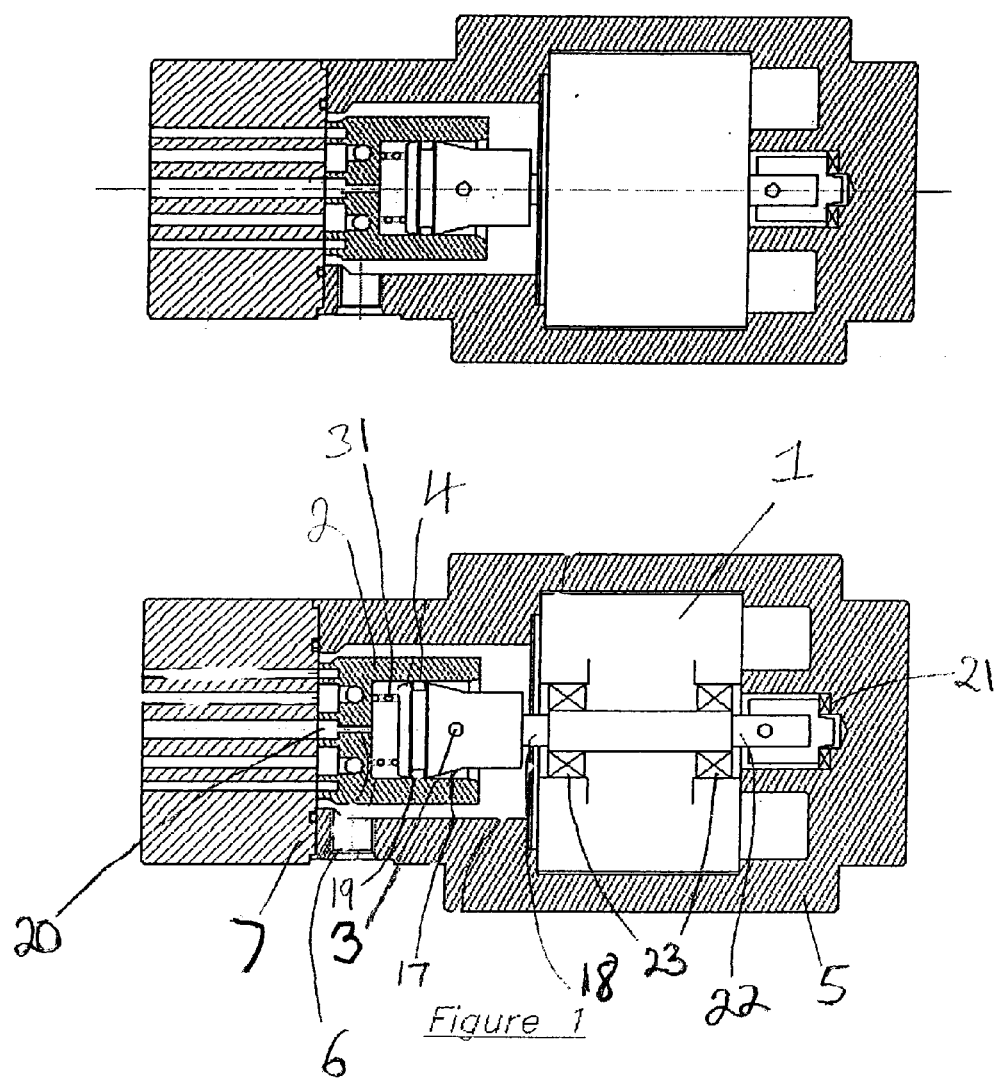
FIG. 1 shows a cross section of a rotary valve, carried within a pressure vessel.

FIG. 1 shows a cross section of a rotary valve, carried within a pressure vessel. An electric motor 1 drives a valve rotor 2 by means of a pin 3 mounted on a balance piston 4 and engaging in a slot (not shown) in the rotor 2. The motor and rotor are carried within a pressure vessel 5 which is connected to a return line from a compressor via a port 6.

Figure 2:
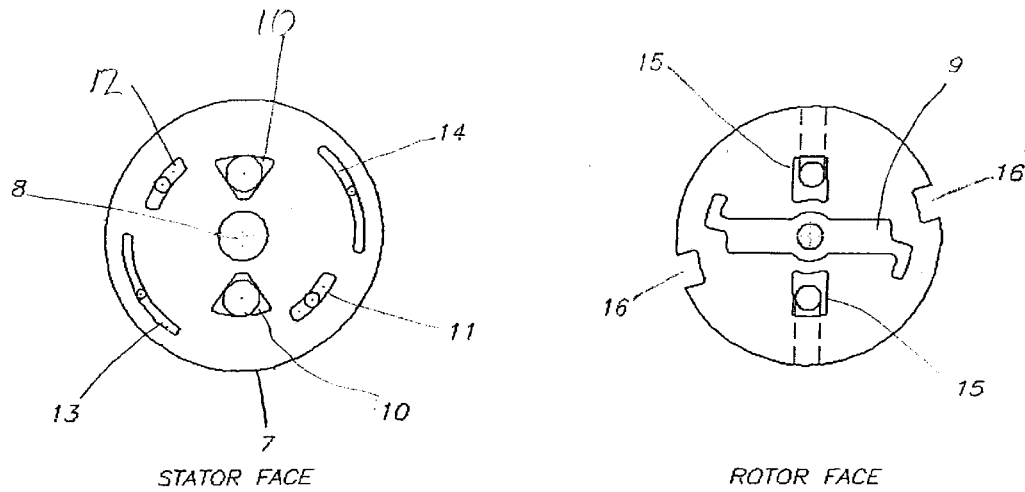
FIG. 2 illustrates the rotor and stator faces for the valve of FIG. 1.

The rotor 2 runs against a stator 7. Both the rotor and stator incorporate valving ports on their opposing faces, such as the typical forms shown in FIG. 2. A supply from the compressor, applied through a port 8 passes through the centre of the stator 7 into a transverse slot 9 in the rotor. This slot passes over ports 10, 11, 12 in the stator 7, commutating gas flow to the various chambers of the PTR. Return flows from the PTR pass into the valve pressure casing 5 via the stator ports 10, 13, 14 and the rotor ports 15 and 16 as the rotor turns. The combined return flows in the valve pressure casing 5 return to the compressor via port 6. A proportion of the external surface of the rotor 2 is exposed to the compressor return line pressure. The differential pressures—between the supply and return ports acting under the rotor at the commutation interface 15 and the return line pressure—act to lift and separate the rotor from the stator. The gas flow provides a backing pressure for the whole cycle while switching is taking place.

This separating force is countered by a balance ram arrangement comprising the piston 4 running in a bore 17 incorporated in the rotor 2 and carried on a motor drive shaft 18. A gas tight seal is maintained between the piston and the rotor bore by a seal 19. Supply pressure at the rotor interface is communicated to the balance ram via a passage 20 in the rotor. The effective area of the balance ram's cylinder and piston is selected to provide a minimum interface closure force sufficient to overcome the pressure derived rotor lift forces, together with an additional margin to create a gas seal. Excessive and undesirable friction forces—or the need to relieve areas of the rotor valving face—are avoided, allowing greater freedom of design. The closure force developed by the balance ram will automatically compensate for both quasi-steady state variations in the system pressures caused by the variations in the initial charge, gas loss over time and PTR temperature variations as well as by the dynamic differential pressures acting on the rotor due to flow induced pressure cycling.

The rotor lift forces will vary with rotor rotational position as the geometry of the areas exposed to the various port pressures vary. In addition, the distribution of pressures across the interface will vary over an extended time period as the condition of the interface surfaces change due to wear. Therefore, an additional margin of closure force is required to accommodate these variations without allowing gas leakage to occur. The use of a separate pressure balancing cylinder facilitates precise setting of these force requirements by varying the effective area of the ram without having to change the rotor or stator valve faces.

A biasing device, such as a light spring, with sufficient force to overcome the balance piston seal friction, is employed to provide an initial seal between the rotor and the stator at the start-up condition. The spring 31 keeps the rotor in contact with the stator when the flow induced pressure differentials are not present. The dimensions of the balance ram are arranged to produce a force sufficient to overcome the rotor separation forces with a margin to accommodate pressure distribution variations and to provide a net interface closure force just sufficient to provide a gas seal across the rotor valving face. The ram also provides sufficient axial movement to accommodate progressive wear of the rotor and stator faces.

The axial force generated by the balance ram acts along the motor shaft 8 and is carried by a thrust bearing arrangement 21 carried by an extended motor shaft 22 at the remote end of the motor 1. FIG. 1 shows a conventional rolling element thrust bearing arrangement. The motor armature radial bearings 23 located within the motor frame allow a degree of axial freedom to accommodate the transmission of the thrust reaction forces through the motor.

Figure 3:
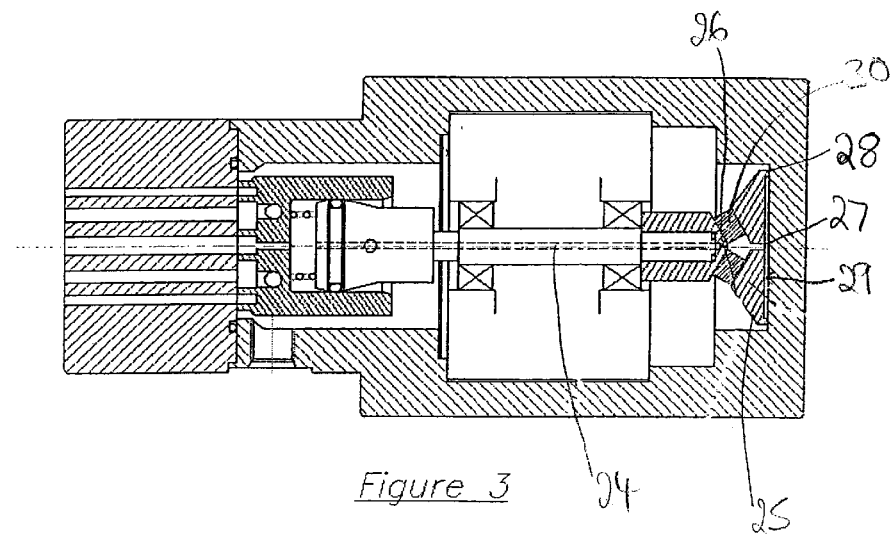
FIG. 3 shows a hydrostatic bearing arrangement for use in the valve of FIG. 1; and, FIG. 4 illustrates an alternative arrangement for mounting a thrust bearing in a valve according to the present invention.

FIG. 3 shows an alternative hydrostatic bearing arrangement. The supply pressure fed to the balance ram also passes through an axial drilling 24 in the motor shaft (shown as a dashed line) to a hydrostatic bearing disc 25. A flow restrictor 26 is mounted within the gas flow path to limit the rate of gas flow. The bearing disc 25 takes the form of a floating disc with a relieved centre 27. Gas pressure is trapped under the bearing disc by the lip 28, running in close proximity to a flat surface 29 provided on the pressure casing. The disc relief allows the trapped gas pressure to act equally over the full exposed area under the rotor, reacting the applied thrust force.

The area of the disc 25 is selected to be somewhat larger than the area of the balance ram 17. The axial forces close the disk to the flat running plate, restricting the gas flow to the point where the pressure differential is sufficient to support the disk on the plate. The under-surface of the rotor disk lip 28 is tapered with a very shallow angle to provide hydrodynamic stability, preventing the disk from tilting and releasing the gas flow to one side. This hydrodynamic stabilising arrangement also helps avoid mechanical contact between the rotor and the running surface 29. The rotor attachment to the motor shaft includes two degrees of angular freedom to allow the rotor to precisely conform to the angle of the thrust plate relative to the motor shaft as it turns. This is shown as a rubber element 30 incorporated in the shaft mounting. It is also used to transmit rotation from the motor shaft to the hydrostatic bearing rotor. Alternatively a ball and socket joint with a pin rotation drive arrangement could be substituted.

In an alternative arrangement, which is suitable for both traditional rolling element bearings or the hydrostatic bearing shown in FIG. 3, the thrust bearing 32 is mounted directly behind a balance piston 33 as shown in FIG. 4.

What is claimed is:

1. A multiple port rotary flow switching valve comprising:
   a rotor;
   a stator;
   a compressor supply; and
   a compressor return; wherein
   gas is supplied via the compressor supply throughout a switching cycle such that it tends to lift the rotor away from the stator; and
   the valve further comprises a balance ram to counteract the effect of the differential pressure produced by the compressor supply, such that a gas seal is formed at an interface between the rotor and the stator.

2. A valve according to claim 1, wherein the balance ram is powered by the compressor supply.

3. A valve according to claim 1, further comprising bias means, such that a seal is provided at the rotor/stator interface at start up.

4. A valve according to claim 1, further comprising a rolling element bearing.

5. A valve according to claim 1, further comprising an axial hydrostatic bearing.

6. A valve according to claim 5, wherein:

the bearing comprises a floating disc having a relieved center; and gas trapped under the disc acts substantially equally over the area under the rotor to react an applied thrust force.

7. A valve according to claim 6, wherein the disc has an area greater than the cross sectional area of a piston of the balance ram.

8. A valve according to claim 1, wherein the rotor is coupled to a motor shaft with two degrees of angular freedom.

9. A valve according to claim 4, wherein the thrust bearing is mounted directly behind the balance ram.

10. A pulse tube refrigerator comprising:

a multiple port rotary valve according to claim 1; and a plurality of chambers to receive gas from the compressor supply.

11. A valve according to claim 2, further comprising bias means, such that a seal is provided at the rotor/stator interface at start up.

12. A valve according to claim 2, further comprising a rolling element bearing.

13. A valve according to claim 3, further comprising a rolling element bearing.

14. A valve according to claim 2, further comprising an axial hydrostatic bearing.

15. A valve according to claim 3, further comprising an axial hydrostatic bearing.

16. A valve according to claim 5, wherein the thrust bearing is mounted directly behind the balance ram.

* * * * *